Patented Apr. 10, 1951

2,548,433

UNITED STATES PATENT OFFICE 2,548,433

PLASTISOLS CONTAINING NITROGENOUS VISCOSITY CONTROLLING AGENTS

David X. Klein, Passaic, and Mark N. Curgan, Clifton, N. J., assignors to Heyden Chemical Corporation, New York, N. Y., a corporation of Delaware No Drawing. Application October 12, 1949, Serial No. 121,061

12 Claims. (Cl. 260—29.1)

Our invention relates particularly to plastisols which have a low viscosity, or which, for example, can be effectively and readily applied, merely by one coating, to a base material such as fabrics, paper, metal foil, etc.

Plastisol is a polyvinyl chloride resin composition containing a resin, a plasticizer, with or without stabilizers and pigments but containing no diluents that are volatile materials. Generally, a plastisol may be applied to the base material by spread-coating, spraying, etc., and the deposited film or coating may, if desired, be heated, for instance to about 350° F., to bring about solution of the plasticizer in the resin and thus form an effective continuous film on the base material.

Difficulties have arisen in the application of this type of coating as plastisols are often too viscous to be practical in use. Attempts to reduce the viscosity of such compositions by the addition of excessive amounts of the plasticizer or small amounts of solvents have been unsuccessful.

Substantially solvent-free vinyl resin compositions are to be preferred as a coating for cloth or paper since they avoid the hazards and expense resulting from the use of solvents. Also, certain difficulties in application have arisen from the fact that plastisols are frequently quite viscous and cannot be easily applied to fabrics, previous attempts to produce a product having a workable viscosity by the use of excessive amounts of plasticizer having generally resulted in films that are too soft and tacky to be of practical use.

Vinyl resins applied to fabrics and paper from solutions in organic solvents are tough, durable and resistant to chemical attack, but their cost is prohibitive for most applications because the solvents required are expensive and the viscosity of the resin is such that the solid content of the solution must be low, thus making it necessary to apply many coats in order to build up an adequate film thickness. In addition, such films are subject to blistering during the solvent removal step at the elevated temperatures generally applied thereto.

We have found that the viscosity of plastisols can be brought to a workable level by the addition of a viscosity-reducing agent. These agents may belong to the group of nitrogen-containing carbon compounds which have dissociation constants greater than $1.0 \times 10^{-6}$, some examples of which may be amines, and more particularly aliphatic amines which are liquids at room temperature. These nitrogen-containing viscosity-reducing agents are particularly suitable in connection with plasticizers having substantially no residual acid groups, as in this way the formation of salts with polymeric ester types is avoided, which might tend to result in an increase of the viscosity.

In accordance with our invention, by the presence of the said viscosity lowering agents, it is also possible to decrease the total amount of the plasticizer used. Furthermore, as a result of the lowered viscosity, the knife coating lines are eliminated, which have previously been apparent when a knife coater is used in coating the fabric, etc., and the air bubbles which tend to form during the preparation of the plastisol, and which were previously removed by deaeration under a vacuum, are diminished or eliminated.

While our invention is capable of embodiment in many different ways, for the purpose of illustration we may proceed as follows in accordance therewith, by way of example.

Examples of a viscosity reducing agent having the desired dissociation constant may be as follows:

Cyclohexylamine—$1.58 \times 10^{-4}$
Morpholine—$2.44 \times 10^{-6}$
Butyl amine—$4.1 \times 10^{-4}$
Ethyl amine—$5.6 \times 10^{-4}$
Dodecyl amine—$4.3 \times 10^{-4}$
N-ethyl morpholine—$1.7 \times 10^{-6}$
Diethylene triamine—$3.4 \times 10^{-4}$
Triethanol amine—$5.2 \times 10^{-4}$
Aniline—$4.6 \times 10^{-10}$ While any of the plastisols above referred to may be used, we may prepare a plastisol in the following manner for the Examples 1 to 11, the proportions given being by weight unless otherwise specified:

We prepare a mixture comprising—

| | Parts by weight |
|---|---|
| Geon resin 121 (a polyvinyl chloride resin manufactured by the B. F. Goodrich Co.) | 133 |
| Flexol plasticizer DOP (comprised of di 2-ethylhexyl phthalate) | 83.25 |

A stabilizer SN (a product used as an inhibitor of discoloration and embrittlement which occurs in films or masses of vinyl resins when heated. It is effective with both vinyl chloride polymers and the chloride-acetate copolymers. This material is identified by the following characteristics:

Color — Amber (12 - Gardner - Holdt)

Specific gravity—1.056 @ 23° C.
Viscosity—syrupy
Lbs. per gallon—8.8
and is manufactured by the Advance
Solvents & Chemical Corporation.)____ 2
A color mix _____ 15

The color mix used in this formulation may comprise

|  | Parts by weight |
|---|---|
| Flexol DOP (di 2-ethylhexyl phthalate) | 30 |
| White lead | 15 |
| Garland green pigment | 45 |

The said color mix is ground on a 3-roll mill until finely dispersed. It is then stirred into the plastisol mixture by hand with a paddle until it becomes homogeneous.

Viscosity readings are taken, using the Brookfield Synchro-Lectric viscosimeter with the #4 spindle. The results are reported in the following table.

Similar mixes containing 2% by weight of the viscosity reducing agents mentioned in Examples 2 to 6, 8, 9 and 11 are prepared. In each case, after the mixture has been hand stirred herewith until it is homogeneous, readings are taken on the said Brookfield viscosimeter. In certain instances additional viscosity readings are taken after the 24 hour aging period. These readings are reported as to the following Examples 1 to 11:

*Viscosity reducing agent*

Ex. 1—None
Ex. 2—N-ethyl morpholine,
  $O(-CH_2-CH_2-)_2N-C_2H_5$
Ex. 3—Cyclohexylamine, $CH_2:(CH_2CH_2):CHNH_2$
Ex. 4—Diethylene triamine,
  $H_2NCH_2CH_2NHCH_2CH_2NH_2$
Ex. 5—Morpholine, $O(-CH_2-CH_2-)_2NH$
Ex. 6—Butyl amine, $C_4H_9NH_2$

*Viscosity (centipoises)*

| Ex. No. | Initial—R. P. M. of Spindle | | | | After 24 Hrs.—R. P. M. of Spindle | | | |
|---|---|---|---|---|---|---|---|---|
|  | 6 | 12 | 30 | 60 | 6 | 12 | 30 | 60 |
| 1 | 69,000 | 46,000 | 20,000 |  |  |  |  |  |
| 2 | 32,500 | 23,500 | 15,600 | 10,000 | 32,500 | 24,750 | 17,200 | 10,000 |
| 3 | 7,500 | 6,500 | 5,800 | 5,500 | 11,500 | 10,000 | 8,900 | 8,250 |
| 4 | 10,000 | 9,000 | 8,000 | 7,500 | 16,500 | 15,250 | 13,800 | 10,000 |
| 5 | 20,500 | 17,000 | 13,300 | 10,000 | 29,000 | 23,750 | 19,000 | 10,000 |
| 6 | 10,000 | 9,000 | 7,400 | 6,300 | 24,500 | 19,750 | 14,900 | 10,000 |

The following are examples prepared with a later sample of Geon 121 admixed as above:

*Viscosity reducing agent*

Ex. 7—None
Ex. 8—Ethyl amine, $C_2H_5NH_2$
Ex. 9—Triethanol amine, $(HOC_2H_4)_3N$

| Ex. No. | Viscosity (Centipoises), R. P. M. of Spindle | | | |
|---|---|---|---|---|
|  | 2 | 4 | 10 | 20 |
| 7 | 34,000 | 25,400 | 17,460 | >10,000 |
| 8 | 9,000 | 9,000 | 8,300 | 7,650 |
| 9 | 5,500 | 7,500 | 7,000 | 6,600 |

The following are examples prepared with another later sample of Geon 121 admixed as above:

*Viscosity reducing agent*

Ex. 10—None
Ex. 11—Aniline, $C_6H_5NH_2$

| Ex. No. | Viscosity (Centipoises), R. P. M. of Spindle | | | |
|---|---|---|---|---|
|  | 2 | 4 | 10 | 20 |
| 10 | 32,200 | 25,900 | >20,000 |  |
| 11 | 19,000 | 17,000 | 13,300 | >10,000 |

Instead of the above plastisol used in Examples 1 to 11 we may, for the following Examples 12 to 18, utilize a plastisol made as follows, the proportions given being by weight unless otherwise specified.

In these Examples 12 to 18, vinyl chloride resin VYNV-2, a copolymer containing more than 95% polyvinyl chloride and less than 5% of polyvinyl acetate, is used. This plastisol, which is prepared by grinding together the ingredients on a 3-roll mill until they are finely dispersed and then hand stirring the mixture, has the following composition:

|  | Parts by weight |
|---|---|
| Vinyl resin VYNV-2 (Carbide and Carbon Chemical Corporation) | 100 |
| Flexol plasticizer DOP (di 2-ethylhexylphthalate) | 45 |
| Flexol plasticizer TOF (trioctyl phosphate) | 50 |
| Color grind (of any desired pigments) | 10 |

The color grind is prepared by grinding the following ingredients on a 3-roll mill:

|  | Parts by weight |
|---|---|
| Flexol plasticizer DOP | 50 |
| Garland green pigment | 40 |
| Titanium dioxide pigment | 10 |

It will be understood that, if desired, in any of the above mentioned plastisols, for any of the above plasticizers a different plasticizer may be used, as for instance dioctylphthalate.

The viscosity of the plastisol is determined using the Brookfield Synchro-Lectric viscosimeter with the #4 spindle. Then similar mixes are prepared which contain 2% of a viscosity reducing agent such as the following. Viscosity data on these plastisols are tabulated for the following examples:

Ex. 12—None
Ex. 13—N-ethyl morpholine,
  $O(-CH_2-CH_2-)_2NC_2H_5$
Ex. 14—Cyclohexylamine, $C_6H_{11}NH_2$
Ex. 15—Diethylene triamine,
  $H_2NCH_2CH_2NHCH_2CH_2NH_2$
Ex. 16—Morpholine, $O(-CH_2-CH_2-)_2NH$
Ex. 17—Armeen 12D (dodecylamine, $C_{12}H_{25}NH_2$
Ex. 18—Butyl amine, $C_4H_9NH_2$

*Viscosity (centipoises)*

| Ex. No. | Initial R. P. M. of Spindle | | | | After 24 Hrs.—R. P. M. of Spindle | | | |
|---|---|---|---|---|---|---|---|---|
|  | 6 | 12 | 30 | 60 | 6 | 12 | 30 | 60 |
| 12 | 45,000 | 35,000 | 20,000 |  |  |  |  |  |
| 13 | 23,000 | 18,000 | 13,000 | 10,000 | 29,000 | 25,000 | 20,000 |  |
| 14 | 5,500 | 6,000 | 6,400 | 6,000 |  |  |  |  |
| 15 | 8,000 | 9,750 | 9,200 | 8,270 | 36,000 | 32,500 | 10,000 |  |
| 16 | 26,000 | 22,000 | 15,000 | 10,000 | 31,000 | 30,000 | 20,000 |  |
| 17 | 4,500 | 5,350 | 5,000 | 4,850 | 18,000 | 18,000 | 16,000 | 10,000 |
| 18 | 4,200 | 4,700 | 4,600 | 4,450 | 49,000 | 37,500 | 20,000 |  |

The limitations of the amount of viscosity-reducing agent desirable to be used in the practice of this invention depend upon the type of resin employed and the amount and type of plasticizers used, and also upon the presence of pigments, stabilizers and other materials commonly included in vinyl resin formulations. It has been found, however, that the use of approximately 0.5 to 5% of the agent is preferable, with 1 to 2% being the most preferred range.

The compositions described in the above examples have been applied to cloth by means of a roller-coater or a doctor blade, cured and then embossed while still hot, and finally cooled. In each case the product is a smoothly coated fabric.

In addition to their use in paper and cloth coating, the vinyl compositions described in this invention have found use in dip molding, slush molding, and flush molding processes. When dip molding techniques are employed it is often possible to build up in a single dipping film thicknesses of as much as $\frac{3}{32}''$, thus lowering the cost of the operation considerably. In slush or flush molding applications these plastisols are quite versatile. Since they contain no solvent which can be entrapped, the construction of the mold is simplified and intricate objects can be prepared without difficulty. In general, the procedure in slush molding involves charging the material into the mold, cursing at approximately 350° F. for 15 minutes to produce a homogeneous product, removing the mold from the oven, and cooling. The product is then removed from the mold.

While we have described our invention above in detail it is to be understood that many changes may be made therein, for instance as to proportions, temperatures, time intervals, etc., without departing from the spirit of our invention.

We claim:

1. A polyvinyl chloride resin composition including a plasticizer, having its viscosity lowered by the presence therein of an aliphatic amine having a dissociation constant greater than $1.0 \times 10^{-6}$ and which is liquid at room temperature.

2. A polyvinyl chloride resin composition including a plasticizer, having its viscosity lowered by the presence therein of an aliphatic ring amine having a dissociation constant greater than $1.0 \times 10^{-6}$ and which is liquid at room temperature.

3. A polyvinyl chloride resin composition including a plasticizer, having its viscosity lowered by the presence therein of an aliphatic ring amine whose amino group possesses an alkyl substituent, said ring amine compound having a dissociation constant greater than $1.0 \times 10^{-6}$ and which is liquid at room temperature.

4. A polyvinyl chloride resin composition including a plasticizer, having its viscosity lowered by the presence therein of an ethanol amine having a dissociation constant greater than $1.0 \times 10^{-6}$ and which is liquid at room temperature.

5. A polyvinyl chloride resin composition including a plasticizer, having its viscosity lowered by the presence therein of an aliphatic amine having a dissociation constant greater than $1.0 \times 10^{-6}$ and which is liquid at room temperature, comprising a vinyl chloride resin containing more than 95% polyvinyl chloride and less than 5% of polyvinyl acetate.

6. A polyvinyl chloride resin composition including a plasticizer, having its viscosity lowered by the presence therein of an aliphatic ring amine having a dissociation constant greater than $1.0 \times 10^{-6}$ and which is liquid at room temperature, comprising a vinyl chloride resin containing more than 95% polyvinyl chloride and less than 5% of polyvinyl acetate.

7. A polyvinyl chloride resin composition including a plasticizer, having its viscosity lowered by the presence therein of an aliphatic ring amine whose amino group possesses an alkyl substituent, said ring amine compound having a dissociation constant greater than $1.0 \times 10^{-6}$ and which is liquid at room temperature, comprising a vinyl chloride resin containing more than 95% polyvinyl chloride and less than 5% of polyvinyl acetate.

8. A polyvinyl chloride resin composition including a plasticizer, having its viscosity lowered by the presence therein of an ethanol amine having a dissociation constant greater than $1.0 \times 10^{-6}$ and which is liquid at room temperature, comprising a vinyl chloride resin containing more than 95% polyvinyl chloride and less than 5% of polyvinyl acetate.

9. A polyvinyl chloride resin composition including dioctylphthalate as a plasticizer, having its viscosity lowered by the presence therein of an aliphatic amine having a dissociation constant greater than $1.0 \times 10^{-6}$ and which is liquid at room temperature, comprising a vinyl chloride resin containing more than 95% polyvinyl chloride and less than 5% of polyvinyl acetate.

10. A polyvinyl chloride resin composition including dioctylphthalate as a plasticizer, having its viscosity lowered by the presence therein of an aliphatic ring amine having a dissociation constant greater than $1.0 \times 10^{-6}$ and which is liquid at room temperature, comprising a vinyl chloride resin containing more than 95% polyvinyl chloride and less than 5% of polyvinyl acetate.

11. A polyvinyl chloride resin composition including dioctylphthalate as a plasticizer, having its viscosity lowered by the presence therein of an aliphatic ring amine whose amino group possesses an alkyl substituent, said ring amine compound having a dissociation constant greater than $1.0 \times 10^{-6}$ and which is liquid at room temperature, comprising a vinyl chloride resin containing more than 95% polyvinyl chloride and less than 5% of polyvinyl acetate.

12. A polyvinyl chloride resin composition including dioctylphthalate as a plasticizer, having its viscosity lowered by the presence therein of an ethanol amine having a dissociation constant greater than $1.0 \times 10^{-6}$ and which is liquid at room temperature, comprising a vinyl chloride resin containing more than 95% polyvinyl chloride and less than 5% of polyvinyl acetate.

DAVID X. KLEIN.
MARK N. CURGAN.

No references cited.